United States Patent [19]

Clark et al.

[11] Patent Number: 5,110,013
[45] Date of Patent: May 5, 1992

[54] SYSTEM FOR DISPENSING LIQUID CLEANING COMPOUNDS

[75] Inventors: Russel W. Clark; James E. Donovan, both of Cincinnati, Ohio

[73] Assignee: Diversey Corporation, Mississauga, Canada

[21] Appl. No.: 726,574

[22] Filed: Jul. 8, 1991

Related U.S. Application Data

[63] Continuation of Ser. No. 500,400, Mar. 28, 1990, abandoned.

[51] Int. Cl.$^5$ .......................... B67D 5/04; B67D 5/60
[52] U.S. Cl. ...................................... 222/382; 141/18; 141/383; 222/464; 222/572
[58] Field of Search .................. 141/18, 65, 286, 329, 141/330, 382, 383, 384, 385, 386, 387, 374; 222/464, 148, 153, 572, 147, 382, 481; 220/5 R, 86.1, 238, 351; 215/252; 251/149, 904, 144, 153; 285/33, 158, 159, 403

[56] References Cited

U.S. PATENT DOCUMENTS

| | | | |
|---|---|---|---|
| 3,572,660 | 3/1971 | Mahon | 261/78 |
| 3,951,293 | 4/1976 | Schulz | 215/261 |
| 4,832,237 | 5/1989 | Hurford, Jr. | 222/464 |
| 4,949,878 | 8/1990 | Jacobi | 222/382 |

Primary Examiner—Henry J. Recla
Assistant Examiner—David J. Walczak
Attorney, Agent, or Firm—Wood, Herron & Evans

[57] ABSTRACT

A container and method for changing liquid cleaning compounds into a dispensing apparatus employs a blow molded plastic container that includes a filling inlet and a discharge outlet. The discharge outlet is a fitting adapted to snap onto a quick connect coupling and includes a tube that extends to the bottom of the container. The tube is inserted into the container while it is still hot. As the container cools, it shrinks forming a tight seal around the tube. The coupling snaps onto the outlet and sealingly engages it. The opposite end of the coupling is attached to the dispenser which acts to evacuate the cleaning compound from the container. Upon depletion of the cleaning compound within the container, the coupling is separated from the container. Since the coupling includes a one-way valve, cleaning compound within the tube is not released. This provides a closed system for dispensing cleaning compounds deterring misuse.

5 Claims, 2 Drawing Sheets

SYSTEM FOR DISPENSING LIQUID CLEANING COMPOUNDS

This is a continuation of copending application Ser. No. 500,400, filed on Mar. 28, 1990, now abandoned.

BACKGROUND OF THE INVENTION

Institutions and industry employ relatively large containers of cleaning solutions used to clean a variety of items including pots and pans, eating utensils and glassware, laundry, and other items. Typically these washing solutions are mechanically dispensed into a washing machine or apparatus. Since relatively large containers, anywhere from 1 gallon to 55 gallons can be employed, dispensing techniques can be very complex and sometimes inconvenient for the operator.

There are many types of liquid cleaning compound dispensing systems. One such system is disclosed in Hurford U.S. Pat. No. 4,832,237 which employs an adaptor for a 55 gallon drum. The adaptor once attached to the drum basically provides a quick connect/disconnect fitting for materials transported in the drum. The adaptor screws into the top of the drum and has a dispensing tube which extends to the bottom of the drum.

Unfortunately this is not a totally closed system. The dispenser must be connected and disconnected by screwing into a drum. The cap of the 55 gallon drum can be opened and the contents of it can be poured out which provides certain disadvantages.

Further, this system requires that the adaptor be screwed onto the container. Once screwed on, this provides for quick connect/disconnect. But this is certainly not a time saving device if smaller containers are used which are attached and remain attached until depleted.

SUMMARY OF THE INVENTION

It is an object of the present invention to provide a container which can be connected to a dispenser for liquid compounds using a snap-on connector which does not require an adaptor.

It is also an object of the present invention to provide a container for holding a liquid cleaning compound which is totally closed permitting it to be connected to a dispenser and preventing the operator from contacting the cleaning compound. Further, it is an object of the present invention to provide such a container which is simple and inexpensive to manufacture.

Further, due to certain regulations, it is necessary that such a container, once the liquid cleaning compound is completely used, be suitable for rinsing prior to disposal of the container. Accordingly, it is an object of the present invention to provide such a container which can, upon depletion of the contents, be easily and quickly rinsed.

These and other objects and advantages of the present invention will be appreciated in light of the following detailed description and drawings in which:

DETAILED DESCRIPTION

Figure 1:
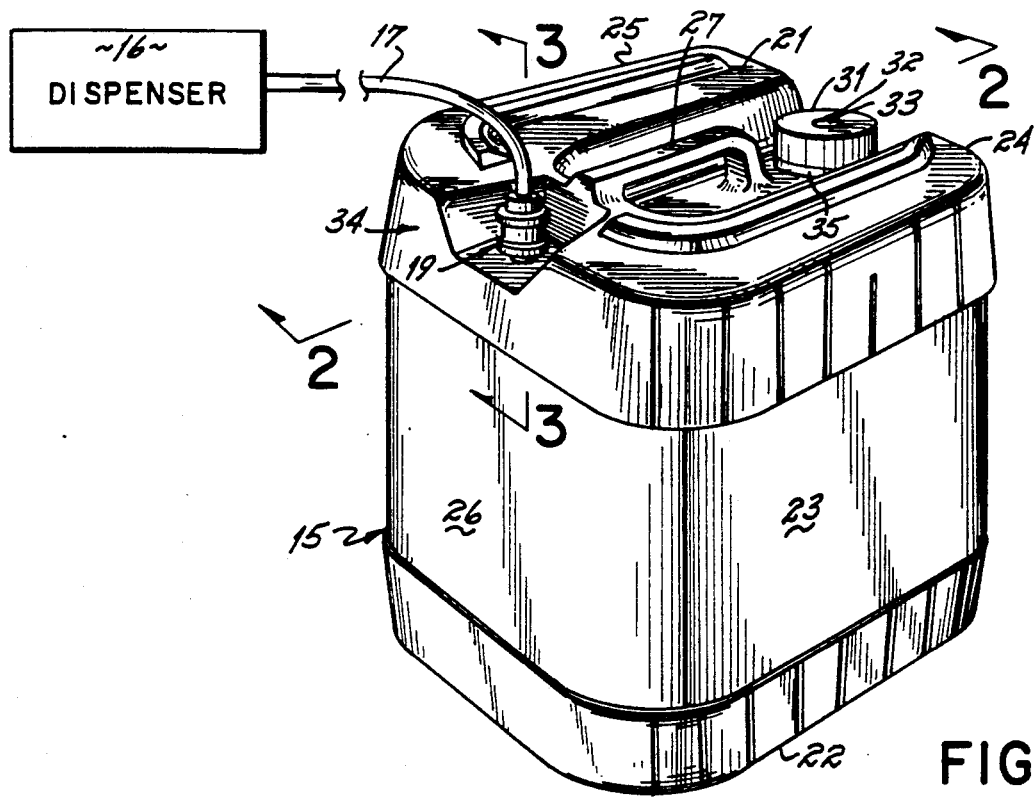
FIG. 1 is a perspective view of a container for use in the present invention.

As shown in FIG. 1, the present invention is a system for dispensing liquid cleaning compounds. The system includes a plastic container 15 for the liquid cleaning compound connected to a dispenser 16 by a tube 17. The tube 17 is attached to a fitting 18 on the container 15 via a coupling 19.

Container 15 includes a top wall 21, bottom wall 22 and four side walls 23-26. Molded into the top wall is a handle 27. Also in the top wall is a large filling opening 28.

Figure 2:
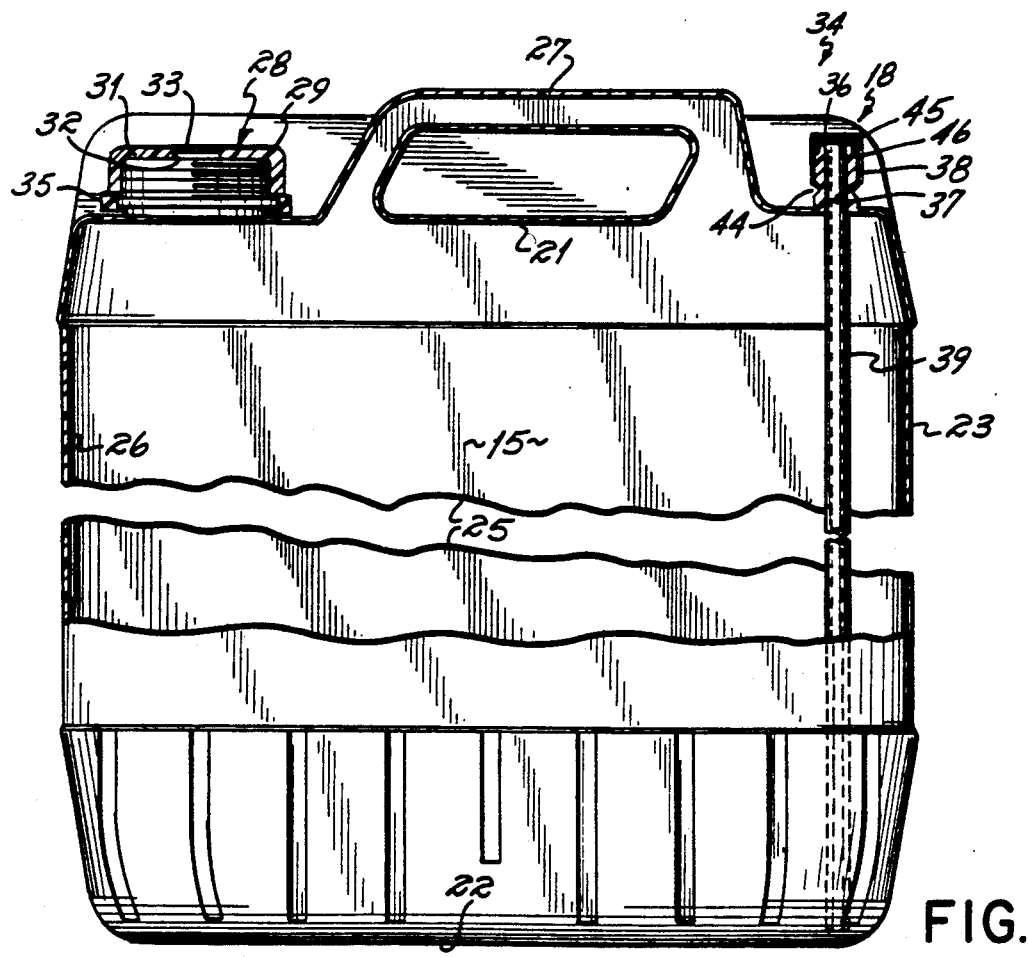
FIG. 2 is a cross sectional view taken at lines 2—2 of FIG. 1 prior to be connected to a liquid cleaning compound.

As shown in FIG. 2, the large filling opening 28 includes a threaded neck portion 29 with a cap 31 screwed onto the neck 29. The cap 31 is plastic and includes an upper opening 32 covered with a fibrous Teflon TM material 33 which provides a liquid impermeable but vapor permeable vent which releases vapors and gases from the interior of the container and prevents the formation of a vacuum.

Cap 31 includes a tamper indication means. Specifically tamper evident breakaway ring 35. Thus if the cap 31 is removed, the ring 35 must be removed providing a visual indication of tampering or misuse.

On top wall 21 opposite to the inlet opening 28 is an recessed area or indentation 34. The male fitting 18 which extends upwardly from this recessed area provides an opening into the interior of the container. The top 36 of the fitting 18 does not extend above the top wall 21 of the container. The fitting 18 has an interior wall 37 and an exterior wall 38. The interior of fitting 18 has a smooth tubular configuration with a specified inner diameter. Compression fitted within the fitting 18 is a tube 39 which has an outer diameter which is approximately equal to the inner diameter of the fitting 18 as constructed (shown in FIG. 3). The tube extends down to the bottom wall 22 of the container where it terminates in a small sump area (not shown) in the bottom wall 22 of the container.

The top of fitting 18 is curved permitting it to engage a seal in the coupling 19 as is described below. The exterior wall 38 of the fitting 18 is contoured and includes a middle annular groove 44 adapted to connect to the coupling 19 described below. Prior to use, the top of this fitting 18 is covered with a polyvinyl chloride cap 45 which is held in place by a cellulose shrink wrap 46.

The container 15 is connected to the dispenser 16 by tube 17 which attaches to a discharge stem 47 extending from the coupling 19. As better shown in FIG. 3, the coupling 19 includes a body portion 51 which has a large hollow cylindrical portion 52. This extends to an an intermediate, smaller, hollow cylindrical portion 53 at shoulder 60. This intermediate portion 53 terminates in a plurality of tines 54. The tines 54 have a general L-shaped configuration and are biased outwardly. Each tine has a hump 55 which in use is adapted to fit into the annular groove 44 in the fitting 18.

Figure 4:
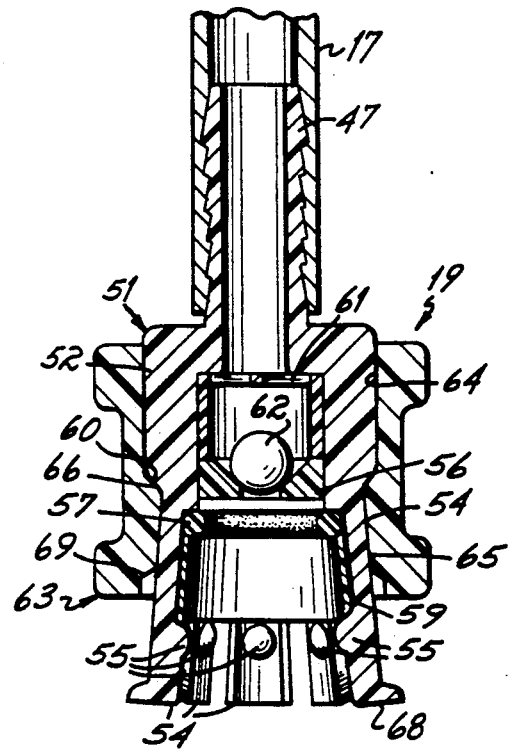
FIG. 4 is a cross sectional view of a connector for use in the present invention in an opened position.

Within the body portion 51 is an O ring 57 which resides within an annular groove 58 within the body 51. The O ring 57 is in turn held in place by a resilient plastic tubular insert 59 which is held in place in turn by the humps 55 in the individual tines 54. This plastic insert 59 acts to force the tines 54 radially outwardly as shown in FIG. 4.

Upstream of the O ring 57 is an annular ledge 56 and above this is a relatively open grid 61. Between the grid 61 and the ledge 56 is a ball 62 which seats on the ledge 56 and acts as a one-way valve. Since the distance between the grid and the ledge is greater than the diameter of the ball this permits detergent to flow upstream in the direction of the arrow 70 but not downstream in the opposite direction.

Figure 3:
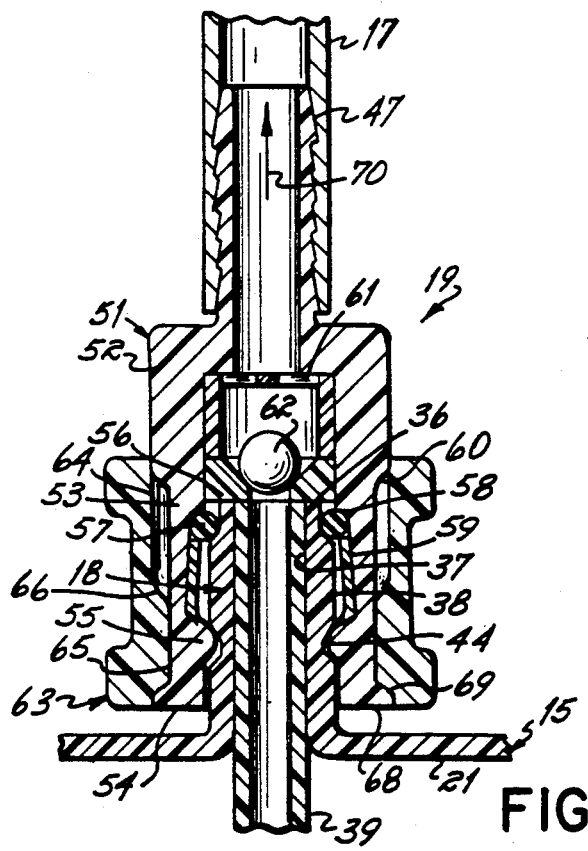
FIG. 3 is a cross sectional view taken at lines 3—3 of FIG. 1 with a coupling attached, also in cross section.

Coupling 19 engages and disengages fitting 18 by sliding a sleeve 63 upwardly and downwardly relative to the tines 54. As shown in FIG. 3, the sleeve 63 fits over the body 51 of the coupling 19. It includes a radially enlarged area 64 and a narrowed constricted area 65 separated by shoulder 66. This shoulder 66 abutts against shoulder 60 separating the larger portion 52 from smaller portion 53 of body portion 51 and acts as an upper stop for the sleeve.

The sleeve 63, when slid in the opposite direction, forces the tines 54 to constrict until the bottom portion 68 of tines 54 fit within an annular groove 69 in sleeve 63. The tubular insert 59 acts to force the tines outwardly so that as the sleeve moves up and down, the tines will flare out and in turn close in permitting the coupling to engage and disengage the fitment 18.

The container 15 is formed by a blow molding process in which all of the walls, the neck portion and the fitting are blow molded in one step using a three piece mold (not shown). The blow molding process requires that the plastic preferably polyethylene, which is used to form the container be heated and pressurized thereby filling the mold. When the mold is separated from the formed container, the container is in a slightly enlarged state. While still at an elevated temperature, tube 39 is slipped into the fitting 18. The internal diameter of the fitting 18 when pulled from the mold is approximately 3% greater than the external diameter of the tube 39. The tube 39 is easily inserted through the hot fitting. As the container 15 cools, the plastic shrinks forming a tight fit between the fitting 18 and the tube 39.

Tube 39 is preferably extruded noncoiled plastic tubing. Otherwise it would eventually curl. The bottom of the tube would move away from the bottom of the container preventing a portion of the contents within the container from being evacuated.

In use, the container 15 is simply positioned at a desired location next to the dispenser 16 and the shrink wrap 46 and cap 45 are removed from the fitting 18. The coupling 19 is then forced down on to the fitting 18 and the sleeve 63 on the coupling 19 forced down around the tines 54. This forces the tines 54 inwardly and causes the individual humps 55 to engage the groove 44 in the fitting 18. The liquid cleaning compound can then be evacuated through the tube 39 and through the fitting 18 into the disepnser 16.

The vent 33 permits air to enter the container 15 preventing a vacuum from forming. When the container is depleted, the sleeve 63 is simply pulled upwardly allowing the tines 54 to disengage the fitting 18 and the coupling 19 is separated from the container 15. At this time, the ball 62 will be forced down against the ledge 56 and prevent any liquid in the tube 17 from discharging from the coupling.

This provides a quick and easy method of connecting a new container of liquid cleaning compound to a disepnser and minimizes operator contact. This is also extremely simple and avoids spilling the cleaning compound. This does not require anything to be inserted into the container. However, with this system substantially all of the cleaning compound is evacuated from the container. Since suction is used to remove the compound, the container remains upright. Therefore no cleaning compound would be spilled if the coupling is inadvertently separated from the container. All in all, the present invention provides a dispensing system which is inexpensive, safe and easy to use.

The preceding has been a description of the present invention as well as the preferred embodiment of the present invention currently known. However, the invention should be defined only by the appended claims wherein we claim:

We claim:

1. A container for a liquid cleaning compound comprising:
    a container body having a top, bottom and side wall, a large filling opening and a small dispensing outlet:
    said filling opening comprising a screw on cap having a central liquid impervious vapor pervious vent opening into said container whereby said cap can be unscrewed and removed to permit filling and rinsing of said container;
    said dispensing outlet including a fitting, said fitting comprising a tubular member having a first end molded to said container and a second end extending from the top wall of said container, said fitting having an inner annular surface having a smooth tubular configuration of uniform diameter from said first end to said second end and an outer annular surface having a contoured configuration adapted to connect to a snap on coupling and a tube compression fitted within said inner annular surface, said tube extending to the bottom of said container wherein liquid cleaning compound can be removed from said dispensing outlet without removing the cap on said large filling opening.

2. The container claimed in claim 1 wherein said cap includes a tamper indication means.

3. The container claimed in claim 2 wherein said tamper indication means comprises a break away ring.

4. The container claimed in claim 1 wherein said tube comprises extruded plastic noncoiled tubing.

5. The container claimed in claim 1 wherein said fitting includes a coupling retention groove.

* * * * *